March 17, 1942.   C. J. STAPELFELD   2,276,520
PRODUCTION OF INSULATION AND RUBBER GOODS
Filed Feb. 27, 1940
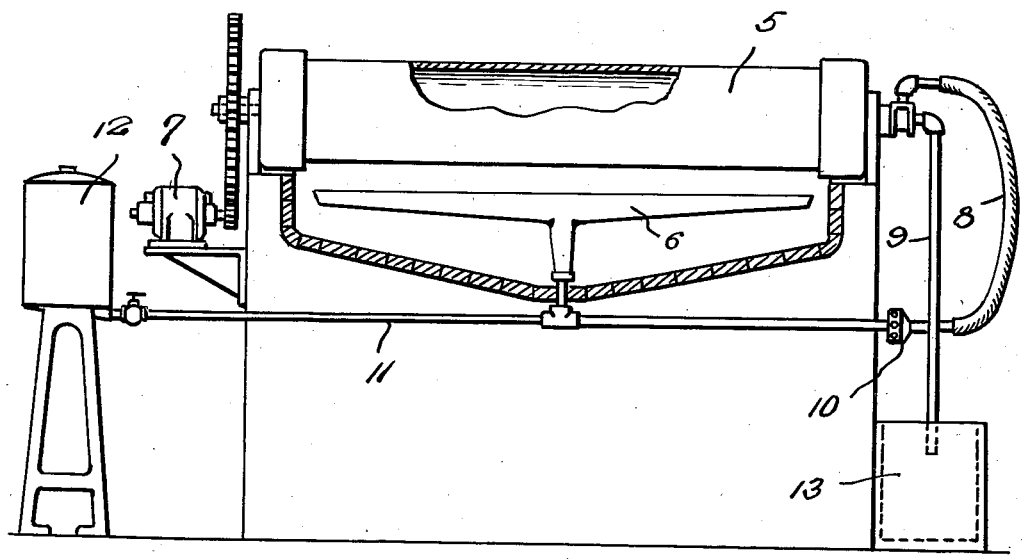
Inventor
Charles J. Stapelfeld,
By Stanley Burch
Attorney Patented Mar. 17, 1942

2,276,520

UNITED STATES PATENT OFFICE 2,276,520

PRODUCTION OF INSULATION AND RUBBER GOODS

Charles J. Stapelfeld, Torrance, Calif., assignor of seven-twentieths to Donald G. Bachtold, Long Beach, Calif., and six-twentieths to M. I. Church, Whittier, Calif.

Application February 27, 1940, Serial No. 321,095

2 Claims. (Cl. 260—765)

This invention relates to the production of electrical insulating material and rubber goods which ordinarily include a considerable quantity of smoked sheet rubber as a filler.

An important object of the present invention is to provide a new filler material which may be substituted for a considerable portion of the smoked sheet rubber ordinarily used, which new filler material is highly efficient but relatively inexpensive so that its use in place of a considerable portion of the smoked sheet rubber results in a considerable reduction in the cost of manufacture of the electrical insulation and rubber goods.

More particularly, the present invention contemplates the production of a new filler material of the above kind from and by a novel processing of shale.

Other objects and features of the present invention will become apparent from the following description, when considered in connection with the accompanying drawing, in which:

The view illustrates diagrammatically, partly in elevation and partly in section, a suitable form of apparatus for use in processing shale in accordance with one of the steps followed in producing the new shale filler forming part of the present invention.

In accordance with the present invention, shale is cracked or broken into small pieces preferably about the size of a walnut, and this cracked shale is placed in a retort which, as shown in the drawing, is preferably in the form of a horizontal drum 5 suitably mounted above a burner 6 for rotation about its longitudinal axis, power-operated means, such as a motor 7 geared to a shaft on one end of the drum 5, being provided to slowly rotate the drum or retort. While the drum or retort 5 is slowly rotated, it is subjected by the burner 6 to a heat of from 450° to 600° Fahrenheit for a period of about five hours, after which the burner 6 is turned off and the material in the drum or retort 5 is allowed to cool, the cooling taking approximately one-half hour. When the cracked shale is subjected to this retorting action, volatile substances and oils are extracted therefrom and are allowed to escape from one end of the drum or retort 5 respectively by way of pipes 8 and 9. The volatile or gaseous substances may be piped to the burner 6 for use in producing the heat necessary to the process after the latter has started, a suitable gas and air mixer 10 being interposed in the connection between the burner 6 and the pipe 8 for this purpose. However, fuel may be supplied to the burner 6 for initially starting the process, by way of a pipe 11 leading from a fuel storage tank 12. The pipe 9 conducts the oil and oily substances from the drum or retort 5 to a suitable collecting tank or receptacle 13.

The residue left in the drum or retort 5 after this processing operation has the resemblance of black soft clinkers or black wood charcoal, and the particles thereof are approximately of the same size as were the pieces of shale originally placed in the retort. This residue is removed and ground to a consistency wherein the largest particles do not exceed the particles of cracked corn, after which the ground material is sifted through a 300 mesh screen, the finer material passing through the screen constituting the present new filler material. It is in the nature of a fine dark powder whose chemical composition consists approximately of water 2%, oil 20%, carbon 5%, iron oxide 6.5%, and silica 66.5%. This new material has been found to provide an efficient filler which may be substituted for a considerable portion of the smoked sheet rubber ordinarily used in the manufacture of electrical insulation and rubber goods, such as retread stock and tread stock for tire shoes, inner tubes, hard rubber insulation, etc. Due to the relatively low cost of production of this new shale filler, its use in place of a considerable portion of the smoked sheet rubber ordinarily used, will result in a considerable reduction in the cost of producing the electrical insulation and rubber goods referred to. Although all shale is not exactly alike, some being richer than others in oil substances and containing more gas than others, any kind of shale can be used for producing the substance or filler described. The composition of such filler will not vary greatly from that given above. It is accordingly to be understood that the term "shale filler," as used herein, is intended to specifically refer to a material having substantially the composition stated above and produced by processing shale substantially as described above. Another important factor in the production of the present shale filler is that the oily substances collected in the receptacle 13 may be processed for producing many by-products such as low and high gravity oil, gasoline, vaseline, ammonia, black wax, sulphur, cryolite and ichthyol oil.

The present invention also embraces formulas or compositions for producing electrical insulation and rubber goods in which the present novel shale filler is employed as an ingredient. In the production of hard rubber insulation, a most desirable product is produced by combining 9 oz. of smoked sheet rubber, 5¾ oz. sulphur, 1⅝ oz. of lime, 25 oz. of shale filler, 2 oz. of zinc oxide, ½ oz. of diphenylguanidine, and 2 oz. of shale oil. Both the smoked sheet rubber and the shale filler act as a body for the insulation, while the sulphur acts in the usual way to cure the rubber. The lime acts as a hardener for the rubber and the diphenylguanidine is an accelerator which improves the compound by controlling the cure and hastening vulcanization. The zinc oxide acts as an activator for this accelerator, and the shale oil acts as a softener for the rubber to aid in milling and mixing the ingredients. These ingredients are processed in the same way and by the use of the usual machinery used in the manufacture of ordinary electrical insulation and rubber goods.

In the production of high grade inner tubes, a most efficient product is had by combining 55 lbs. of smoked sheet rubber, 38 lbs. of shale filler, 4 lbs. of shale oil, 1½ lbs. of sulphur, 1 lb. of zinc oxide, and ½ lb. of diphenylguanidine. For producing retread stock for tire shoes, a most efficient composition consists of 27 lbs. of smoked sheet rubber, 57 lbs. of shale filler, 6½ lbs. of shale oil, 6 lbs. of zinc oxide, 3 lbs. of sulphur, and ½ lbs. of diphenylguanidine. Best results in producing a high grade black tread stock are secured by combining 62 lbs. of smoked sheet rubber, 25 lbs. of shale filler, 10 lbs. of zinc oxide, 2 lbs. of sulphur, 1 lb. of diphenylguanidine, 3 lbs. of mineral rubber, and 1 lb. of hard wood pitch. In the latter formula, the mineral rubber acts as a softener and cheap filler, while the hard wood pitch gives nerve and tensile strength to the product.

In view of the above, it will be seen that the present invention provides for a considerable reduction in the cost of producing electrical insulating material and rubber goods by providing an efficient and comparatively cheap substitute for a considerable portion of the smoked sheet rubber ordinarily used as a filler in the production of these products. As a matter of fact, use of the present new shale filler has been found to improve the product, as compared to those where the smoked sheet rubber has been used exclusively or without the shale filler. The process for producing the shale filler may be easily and expeditiously carried out by unskilled labor and by means of apparatus which is comparatively simple and inexpensive.

What I claim as new is:

1. A composition for producing electrical insulation and/or rubber goods, including at least 15% and not more than 75% rubber, sulphur, zinc oxide, diphenylguanidine, and at least 15% and not more than 75% a filler consisting of the dark residue of distilled shale ground to a fine powder and composed of approximately 2% water, 20% oil, 5% carbon, 6.5% iron oxide, and 66.5% silica.

2. A composition for producing electrical insulation and/or rubber goods, including at least 15% and not more than 75% rubber, and at least 15% and not more than 75% a filler consisting of the dark residue of distilled shale ground to a fine powder and composed of approximately 2% water, 20% oil, 5% carbon, 6.5% iron oxide, and 66.5% silica.

CHARLES J. STAPELFELD.